United States Patent [19]

Cipris et al.

[11] 4,452,675

[45] Jun. 5, 1984

[54] PROCESS FOR THE ACTIVATION OF NICKEL ELECTRODES VIA THE ELECTROCHEMICAL DEPOSITION OF SELENIUM AND/OR TELLURIUM

[75] Inventors: Divna Cipris, Morristown; Arthur T. Walsh, Morris Plains, both of N.J.

[73] Assignee: Allied Corporation, Morris Township, Morris County, N.J.

[21] Appl. No.: 434,984

[22] Filed: Oct. 18, 1982

[51] Int. Cl.³ ............................................. C25D 11/00
[52] U.S. Cl. ................................. 204/56 R; 429/223
[58] Field of Search ...................... 204/56 R; 429/223

[56] References Cited

U.S. PATENT DOCUMENTS

| | | | |
|---|---|---|---|
| 2,258,963 | 10/1941 | Woll | 204/56 R |
| 2,414,438 | 1/1947 | Bloom | 204/56 R |
| 2,649,409 | 8/1953 | Von Hippel | 204/56 R |
| 3,466,231 | 9/1969 | MacArthur | 204/56 R |
| 3,579,385 | 5/1971 | Feduska | 204/56 R |
| 3,753,875 | 8/1973 | Douet | 204/56 R |
| 4,115,238 | 9/1978 | Cipris | 204/290 |
| 4,253,919 | 3/1981 | Hall et al. | 204/56 R |

OTHER PUBLICATIONS

D. Cipris et al., J. Electroanalytic Chem., vol. 73, p. 125 (1976).
U.S. Ser. No. 434,983, D. Cipris et al., "Secondary Battery With Selenium And/Or Tellurium Doped Nickel Electrodes".

*Primary Examiner*—John F. Niebling
*Attorney, Agent, or Firm*—Kenneth E. Stroup, Jr.; Alan M. Doernberg; Thomas D. Hoffman

[57] ABSTRACT

Nickel electrodes having selenium and/or tellurium electrochemically deposited thereon are disclosed. The nickel electrodes of this invention may be employed in primary or secondary alkaline batteries, and said electrodes exhibit improved currents and charges (i.e. with respect to pure nickel electrodes) when said electrodes are employed in primary or secondary batteries.

11 Claims, No Drawings

PROCESS FOR THE ACTIVATION OF NICKEL ELECTRODES VIA THE ELECTROCHEMICAL DEPOSITION OF SELENIUM AND/OR TELLURIUM

BACKGROUND OF THE INVENTION

The present invention relates to a process for producing nickel electrodes having enhanced active mass utilization for use in primary or secondary batteries. The disclosed process is an electrochemical process which involves the deposition of selenium or tellurium or mixtures thereof onto nickel electrodes. The fundamental reaction, for operation of the nickel-alkaline secondary battery is as follows:

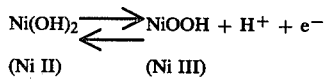

$$Ni(OH)_2 \rightleftarrows NiOOH + H^+ + e^-$$
$$\text{(Ni II)} \quad\quad \text{(Ni III)}$$

The reverse reaction, the conversion of Ni(III) to Ni(II), is the fundamental reaction for operation of the nickel alkaline primary battery.

In conventional secondary batteries, about 50 percent of the nickel goes to an inactive plaque (current collector and support structure). The remaining 50 percent of the electrode is in the active mass. Even when the efficiency of the active mass utilization is 80–90 percent, the total utilization of nickel in the electrode is only approximately 40–45 percent. Thus, nickel, a relatively expensive material, is poorly utilized.

Several techniques have been described to improve the utilization of nickel in a nickel oxide positive electrode. Techniques such as pressed powders, plastic bonding and other improved techniques, including one called "Controlled-Micro-Geometry" employing perforated thin sheets of nickel laminated to a desired thickness and impregnated with the active mass, have been described. These techniques have improved the total utilization of nickel, but have increased the fabrication costs for the electrode.

In addition, techniques of improving nickel active mass utilization have been described involving codeposition of cobalt hydroxide with the nickel or solution doping the nickel with lithium. While cobalt codeposition does substantially improve nickel utilization, the cost of even 5–10 percent of cobalt substantially increases the cost of the electrode. While doping with lithium does produce a beneficial effect, the effect is lost once the nickel oxide becomes saturated with lithium, through formation of $LiNiO_2$.

The use of nickel plates are electrodes for oxygen evolution has been described in U.S. Pat. No. 4,115,238 to Cipris (1977) and in D. Cipris et al., J. Electroanalytic Chem. Volume 73, p. 125 (1976). In these disclosures, nickel is coated by treatment with selenious acid and/or the equivalent tellurous acid, or both, followed by heating in air. The application of these electrodes, however, was under sufficient voltage to generate oxygen at the electrode, and no cycling was performed of the nickel oxide-selenium coated electrode charged and discharged states.

In a copending commonly assigned application filed herewith Ser. No. 434,983 filed Oct. 18, 1982, Cipris and Walsh disclose a secondary battery comprising a nickel oxide positive electrode, an alkaline electrolyte and a negative electrode wherein the nickel oxide positive electrode is thermally doped with selenium and/or tellurium. Cipris and Walsh additionally disclose a process for forming the nickel oxide positive electrode from a nickel powder by contacting the nickel powder with a selenium and/or tellurium containing aqueous solution, heating the nickel powder in the presence of an oxygen-containing gas, then forming the powder into an electrode.

BRIEF DESCRIPTION OF THE INVENTION

The present invention relates to an electrochemical process for the activation of a nickel electrode wherein said process comprises:

(a) contacting said nickel electrode with an electrically conductive solution wherein said solution contains at least one compound selected from the group consisting of selenium and tellurium in the positive valence state, and (b) applying a voltage to said nickel electrode and generating thereby a current which results in the deposition of said selenium, tellurium, or mixtures thereof, from said solution onto said nickel electrode.

DETAILED DESCRIPTION OF THE INVENTION

In accordance with this invention, an electrochemical process is provided which involves the electrochemical deposition of selenium and/or tellurium in oxidized form onto nickel electrodes. Nickel electrodes having selenium and/or tellurium deposited thereon by the process of this invention exhibit substantially higher current and coulombic charges in the potential region where interconversion of $Ni^{+2}$ and $N^{+2}$ occurs, as compared to control electrodes constructed of pure nickel.

The activity (i.e., current and coulombic charges in the applicable potential region) of various types of nickel electrodes may be increased by the process of this invention. For example, nickel plate electrodes, pressed powder nickel electrodes, nickel electrodes having porous structures, etc. may be activated in accordance with this invention.

The process of this invention may be conducted in any one of a number of different types of electrolytic cells. The type of cell employed is not critical, and any electrolytic cell is suitable.

In the process, an electrically conductive aqueous solution (supporting electrolyte) containing selenium and/or tellurium in the positive valence state is placed into the electrolytic cell. Suitable electrically conductive aqueous solutions include organic acids, inorganic acids, organic bases, inorganic bases, or any salt thereof. Illustrative examples of suitable electrically conductive organic acids include acetic acid, formic acid, oxalic acid, boric acid, propionic acid, etc. Illustrative examples of suitable electrically conductive inorganic acids include sulfuric acid, hydrochloric acid, nitric acid, phosphoric acid, etc. Illustrative examples of suitable electrically conductive organic bases include ethyl amine(s), butyl amines, tetraalkyl ammonium compounds, etc. Illustrative examples of suitable electrically conductive inorganic bases include sodium hydroxide, potassium hydroxide, and mixtures thereof, etc. In many preferred embodiments of this invention, acetic acid is employed as the electrically conductive solution.

As described, the electrically conductive solution will contain at least one compound which contains selenium or tellurium in the positive valence state. The concentration of the selenium or tellurium containing compound in the electrically conductive solution should be between about 5 mg/mL and about 100 mg/mL. In many preferred embodiments of this invention, the concentration of the selenium containing compound in the electrically conductive solution ranges from about 5 mg/mL to about 60 mg/mL. In many especially preferred embodiments of this invention, this concentration should range from about 10 mg/mL to about 30 mg/mL.

Selenium and tellurium containing compounds which may be employed in this invention include any compound which contains selenium or tellurium in the positive valence state. Illustrative generic examples of such compounds include selenium or tellurium oxides, halides, oxyhalides, sulfides or organic salts such as methoxides or ethoxides, etc. Specific examples of selenium and tellurium containing compounds which may be employed in this invention include selenious acid, tellurous acid, selenic acid and telluric acid, with selenious acid and tellurous acid being the preferred selenium and tellurium containing compounds for this invention.

The deposition of selenium and/or tellurium onto nickel electrodes is accomplished by placing the electrically conductive solution containing the selenium and/or tellurium compound into an electrolytic cell and then placing the nickel electrode to be activated into the cell in contact with said solution. A negative voltage (i.e., versus a reference electrode) is then applied to the nickel electrode by cycling the electrode at least once over a suitable negative voltage range versus a reference electrode. The negative voltage generates a current which causes the deposition of selenium and/or tellurium positive ions onto the nickel electrode. For example, when acetic acid is employed as the electrically conductive solution and selenious acid is employed as the selenium containing compound, a suitable cycling range would be from about 0 volts to about $-1.5$ volts versus the standard calomel electrode. A suitable cyclying rate would be about 2 mV/s. Cycling ranges and cyling rates for other combinations of electrolytes, selenium or tellurium dopants, and other reference electrodes may easily be determined without undue experimentation by those having skill in the art of electrochemistry.

Nickel electrodes which have selenium and/or tellurium deposited thereon in accordance with this invention exhibit increased activity (i.e. increased current and coulombic charges) when ssaid electrodes are employed in primary or secondary alkaline batteries. Support for the preceding statement may be found in the Examples hereinbelow wherein selenium-doped nickel electrodes were subjected to cyclic voltammetry testing in alkaline media.

In another embodiment of this invention, selenium and/or tellurium may be deposited onto nickel electrodes with nickel hydroxide from a nickel salt in order to produce nickel electrodes having enhanced activity for use in primary and secondary batteries. In this embodiment, a nickel salt is dissolved in the electrically conductive solution in conjunction with the selenium and/or tellurium containing compounds. Suitable nickel salts for this embodiment include nickel nitrates, acetates, sulfates and the like. Example 8 of this application illustrates the enhanced activity of nickel electrodes having deposited thereon selenium and nickel hydroxide. Additionally, nickel electrodes having selenium and/or tellurium electrochemically deposited thereon at room temperature, along with nickel hydroxide, have activities (i.e., coulombic and current charges) that are essentially equivalent to the activites of nickel electrodes having electrochemically deposited thereon nickel hydroxide and cobalt hydroxide wherein the deposition of nickel hydroxide and cobalt hydroxide was accomplished at 95° C. This fact is illustrated by a comparison of Example 8 and Example 10 in Table II hereinbelow.

EXAMPLE 1

Nickel electrodes (plate) were placed into a conventional three-compartment electrolytic cell in 1.0 M acetic acid containing 15 mgmL$^{-1}$ selenious acid and cycled at 2 mVs$^{-1}$ between 0 and $-1.0$ vs. SCE (one cycle). The selenium plated electrodes were removed from the cell and washed thoroughly with distilled water. The electrodes were then electrochemically tested in 7.0 N KOH (30% by weight) by cyclic voltammetry by cycling the electrodes through the potential region 0 to 0.5 V vs. SCE at 2 mVs$^{-1}$. Current and coulombic charge values were determined after 5 cycles. These values are reported in Table 1.

EXAMPLE 2

Example 1 was repeated, except that the 1.0 M acetic acid solution *did not contain* any selenious salt. The current and charge values obtained with these control electrodes are shown in Table I.

EXAMPLE 3

Example 1 was repeated, except that the 1.0 M actic acid solution contained nickel acetate (25 mgmL$^{-1}$) instead of selenious acid. The current and charge values obtained with these electrodes are shown in Table I.

EXAMPLE 4

Example 1 was repeated, except that the 1.0 M acetic acid solution contained nickel acetate (25 mgmL$^{-1}$) in addition to selenious acid (15 mgmL$^{-1}$).

Current and charge values obtained upon the subsequent cycling in the potential region 0 to 0.5 V vs. SCE in 30% KOH are shown in Table I

EXAMPLES 5a AND 5b

Nickel powder (325 mesh, grade 255) was mixed with 1% polyethylene powder (+200 mesh) and pressed (at 117° C.) into nickel exmet screen.

Pressed powder electrodes (5a) were then subjected to selenium plating and electrochemical testing in Example 1. Current and charge values were compared with pressed powder electrodes made of *pure* nickel (5b). These values are reported in Table I. The activity of selenium plated electrodes was substantially higher.

The data obtained from Examples 1–5 are illustrated in Table I.

TABLE I

Current and Coulombic Charges for Ni Electrodes Examined in Examples 1 Through 5.

| Example | Current, $i_p$ (mA) | | Charge, Q (coulombs) | |
|---|---|---|---|---|
| | Anodic | Cathodic | Anodic | Cathodic |
| 1. Se on Ni | 22.0 | 18.0 | $1.5 \times 10^{-1}$ | $5.0 \times 10^{-2}$ |
| 2. Pure Ni (control) | 3.5 | 3.0 | $6.0 \times 10^{-2}$ | $1.0 \times 10^{-2}$ |
| 3. Ni on Ni | 4.5 | 3.2 | $9.0 \times 10^{-2}$ | $2.0 \times 10^{-2}$ |
| 4. Ni & Se on Ni | 40.0 | 30.0 | $6.0 \times 10^{-1}$ | $2.0 \times 10^{-1}$ |

TABLE I-continued

Current and Coulombic Charges for Ni Electrodes Examined in Examples 1 Through 5.

| Example | Current, $i_p$ (mA) | | Charge, Q (coulombs) | |
|---|---|---|---|---|
| | Anodic | Cathodic | Anodic | Cathodic |
| *5a. Se on Ni | 750 | 650 | $5.5 \times 10^0$ | $4.0 \times 10^0$ |
| *5b. Pure Ni | 180 | 150 | $1.0 \times 10^0$ | $7.4 \times 10^{-1}$ |

*The electrodes employed and tested were pressed powder nickel electrodes.

The above results clearly illustrate that nickel electrodes which have selenium electrochemically deposited thereon have higher activities than nickel electrodes which have no selenium electrochemically deposited thereon.

EXAMPLE 6

The same as Example 1, except that selenium was plated into a *platinum* substrate. No subsequent current rise was observed in the potential region 0 to 0.5 V vs. SCE in 30% KOH.

EXAMPLE 7

Nickel hydroxide was deposited onto nickel test electrodes by electrolysis from 1.80 M solution of Ni(NO$_3$).6H$_2$O at room temperature (30 mAcm$^{-1}$, 1 min; pH=3.5). After the deposition, the electrode was washed thoroughly with distilled water and examined in 30% KOH by cyclic voltammetry in the potential region 0 to 0.5 V vs. SCE (the region where interconversion of Ni(II) and Ni(III) takes place). The current and coulombic charge values are given in Table II.

EXAMPLE 8

Example 7 was repeated, except that the aqueous nickel nitrate solution contained selenious acid (0.12 M H$_2$SeO$_3$). The subsequent testing of the electrodes containing selenium and nickel coprecipitate yielded current and charge values superior to those obtained for Example 7.

EXAMPLE 9

Example 8 were repeated, except that the aqueous nickel nitrate solution contained cobalt nitrate (0.20 M Co(NO$_3$)$_2$.6H$_2$O) instead of selenious acid. The current and charge values obtained upon cycling in 30% KOH are reported in Table II.

EXAMPLE 10

Example 9 was repeated, except that the coprecipitation of Ni(OH)$_2$ and Co(OH)$_2$ was conducted at 95° C. for 5 min. The current and charge values of subsequent testing in 30% KOH are reported in Table II.

TABLE II

Current and Coulombic Charges for Ni Electrodes Examined in Examples 7 Through 10

| Example | Current, $i_p$ (mA) | | Charge, Q (coulombs) | |
|---|---|---|---|---|
| | Anodic | Cathodic | Anodic | Cathodic |
| 7. Pure Ni(OH)$_2$ | 120 | 80 | $5.4 \times 10^{-1}$ | $3.3 \times 10^{-1}$ |
| 8. Ni(OH)$_2$ & Se | 200 | 200 | $9.4 \times 10^{-1}$ | $5.5 \times 10^{-1}$ |
| 9. Ni(OH)$_2$ & Co(OH)$_2$ (Room Temp., 1 min) | 30 | 20 | $3.3 \times 10^{-1}$ | $1.5 \times 10^{-1}$ |
| 10. Ni(OH)$_2$ & Co(OH)$_2$ (95° C., 5 min) | 200 | 200 | $9.5 \times 10^{-1}$ | $7.1 \times 10^{-1}$ |

The data reported in Table II illustrates that nickel electrodes with nickel hydroxide and selenium deposited thereon at room temperature have activities which are superior to the activities of electrodes having nickel hydroxide and cobalt hydroxide deposited thereon under similar conditions. The data further illustrates that nickel electrodes with nickel hydroxide and selenium deposited thereon at room temperature results in electrodes having activities which are equivalent to the activities of electrodes having nickel hydroxide and cobalt hydroxide deposited thereon at high temperatures.

We claim:

1. An electrochemical process for activation of a nickel electrode useful as the positive electrode of a secondary battery which comprises:
   (a) contacting said nickel electrode with an electrically conductive solution wherein said solution contains at least about 5 mg/mL to about 100 mg/mL of one compound selected from the group consisting of selenium and tellurium in the positive valence state, and
   (b) applying a voltage to said nickel electrode and generating thereby a current which results in the doping of said selenium, tellurium, or mixtures thereof, from said solution onto said nickel electrode.

2. A process according to claim 1 wherein said electrically conductive solution is selected from the group consisting of organic acids, inorganic acids, organic bases, inorganic bases, or any salt thereof.

3. A process according to claim 2 wherein said organic acid is acetic acid.

4. A process according to claim 3 wherein said selenium is present in the form of selenious acid.

5. A process according to claim 4 wherein said concentration is between about 10 mg/mL and about 30 mg/mL.

6. A process according to claim 4 wherein said tellurium is present in the form of tellurous acid.

7. A process according to claim 6 wherein said concentration is between about 10 mg/mL and about 30 mg/mL.

8. A process according to claim 1 wherein said electrically conductive solution additionally contains a nickel salt.

9. A process according to claim 8 wherein said nickel salt is nickel nitrate.

10. A process according to claim 1 wherein said nickel electrode is selected from the group consisting of plate, pressed powder or porous structure nickel electrodes.

11. A nickel electrode produced in accordance with claim 1.

* * * * *